(12) United States Patent
DeMaio (10) Patent No.: US 11,183,861 B2
(45) Date of Patent: Nov. 23, 2021

(54) EXTERNAL WATCH BATTERY AND CHARGING DEVICE

(71) Applicant: Robert Charles DeMaio, Sparks, NV (US)

(72) Inventor: Robert Charles DeMaio, Sparks, NV (US)

(*) Notice: Subject to any disclaimer, the term of this patent is extended or adjusted under 35 U.S.C. 154(b) by 222 days.

(21) Appl. No.: 16/664,000

(22) Filed: Oct. 25, 2019

(65) Prior Publication Data

US 2021/0126477 A1    Apr. 29, 2021

(51) Int. Cl.

| | | |
|---|---|---|
| *H02J 7/00* | (2006.01) | |
| *H02J 7/02* | (2016.01) | |
| *G04G 17/06* | (2006.01) | |
| *G04G 19/00* | (2006.01) | |
| *H01M 50/20* | (2021.01) | |
| *H01M 50/50* | (2021.01) | |

(52) U.S. Cl.
CPC ............ *H02J 7/0045* (2013.01); *G04G 17/06* (2013.01); *G04G 19/00* (2013.01); *H01M 50/20* (2021.01); *H01M 50/50* (2021.01); *H02J 7/0021* (2013.01); *H02J 7/025* (2013.01); *H01M 2220/30* (2013.01)

(58) Field of Classification Search
None
See application file for complete search history.

(56) References Cited

U.S. PATENT DOCUMENTS

| | | | |
|---|---|---|---|
| 2004/0131928 A1* | 7/2004 | Dayan ................. | H04M 1/0262 429/123 |
| 2005/0208346 A1* | 9/2005 | Moon ................. | H01M 50/543 429/7 |

\* cited by examiner

*Primary Examiner* — Arun C Williams
(74) *Attorney, Agent, or Firm* — Tatonetti IP (57) ABSTRACT

An external battery device is implemented which can detachably engage with a smartwatch to thereby enable seamless battery replacement and smartwatch battery replenishment without having to remove the smartwatch from a user's wrist. The external battery device can be a bezel that aesthetically fits in a cut-out around a perimeter of the smartwatch's face and locks in place using, for example, a male-female connection mechanism. The external battery device includes a casing that functions as the bezel for the watch. The casing includes a channel inside which a rechargeable battery is positioned. The male connectors of the external battery device extend downward from a hole in the casing to engage with corresponding female receptacles on the smartwatch. In typical implementations, two different shapes of the male and female connection mechanisms may be used to provide a consistent manner in which the user connects the external battery device to the smartwatch.

11 Claims, 11 Drawing Sheets

EXTERNAL WATCH BATTERY AND CHARGING DEVICE

CROSS-REFERENCE TO RELATED APPLICATIONS

This Non-Provisional Patent Application claims benefit and priority to related U.S. Non-Provisional Design Patent Application Ser. No. 29/710,783, filed the same day on Oct. 25, 2019, entitled Watch and Bezel, the entire contents of which is hereby incorporated herein by reference. This Non-Provisional Patent Application claims benefit and priority to related U.S. Non-Provisional Design Patent Application Ser. No. 29/710,785, filed the same day on Oct. 25, 2019, entitled Charging Device, the entire contents of which is hereby incorporated herein by reference.

BACKGROUND

Modern smartwatches come equipped with numerous features including locational tracking using a global positioning system (GPS), internet connectivity, communications capabilities (e.g., text, calls, etc.), and various multimedia playing functionality. While small form factor technology is available to implement a robust ecosystem of features on smartwatches akin to smartphone functionality, battery power can limit the smartwatch's practical life and thereby hinder its widespread adoption, even with a robust set of features.

SUMMARY

An external battery device is implemented which can detachably engage with a smartwatch to thereby enable seamless battery replacement and smartwatch battery replenishment without having to remove the smartwatch from a user's wrist. The external battery device can be a bezel that aesthetically fits inside a cut-out around a perimeter of the smartwatch's face and locks in place using, for example, a male-female connection mechanism. The external battery device includes a casing that functions as the bezel for the watch. The casing includes a channel inside which a rechargeable battery is positioned. The male connectors of the external battery device extend downward from a hole in the casing to engage with corresponding female receptacles on the smartwatch. In typical implementations, two different shapes of the male and female connection mechanisms may be used to provide a consistent manner in which the user connects the external battery device to the smartwatch.

The battery takes the form, at least in part, of the shape of the casing. Positive and negative electrical contacts, or terminals, extend outward from the battery through respective holes in the casing and are exposed on an inside wall of the casing to enable a connection with corresponding contact points on the smartwatch. In some implementations, the external battery device may form a round bezel which locks in place by rotating the bezel clockwise and unlocks responsive to a counterclockwise movement. In other implementations, the external battery device may form a square bezel which press-fits into the corresponding female receptacles on the smartwatch.

A charging device is also disclosed which includes a base and a platform that extends upward from the base. The base and platform may each be configured with wireless charging surfaces to enable wireless charging of a computing device upon contact. The base includes a recess in front of where the platform extends to provide support to a computing device, such as a smartphone. The base's surface may gradually raise until reaching the recess to provide further support to the smartphone and thereby prevent the smartphone from sliding down.

A side and rear of the platform includes respective female receptacles to enable charging adapters to connect to the charging device, and thereby increase the number of accessories that can be charged with the charging device. The female receptacles include adjacently positioned electrical contacts on an inside of the receptacle, which engage with an external charging device when connected. External charging devices can include a laterally extending platform on which, for example, a smartwatch can rest.

Another external charging device can include a charging shaft that includes a series of electrical contacts for charging the external battery devices discussed above. Each set of electrical contacts can charge a single external battery device. In some implementations, five sets of electrical contacts can be implemented to enable the simultaneous charging of five different external battery devices (e.g., bezels for the watch). Each set of electrical contacts can be coupled to an indicator light that changes color based on a detected status of the battery. For example, green can indicate fully charged, yellow can indicate partial charging, and red can indicate a low battery. A single set of electrical contacts can be, for example, contact points that are axially aligned around the charging shaft.

As a user can charge multiple batteries at once, the user is free to take multiple different external battery devices when going about his or her day. This enables the user to easily and periodically switch out his or her smartwatch's battery to provide longer life. As smartwatch functionality continues to improve and smartphone functionality migrates to the smartwatch, having a reliable battery source can meet the demands of such functionality. The external battery devices, or bezels, may come in various colors to provide the dual effect of charging the smartwatch and changing the smartwatch's aesthetic appearance. This can further enable a user to change his or her look based on where the user is going, the user's mood, outfit, or other reasons.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

Figure 1:
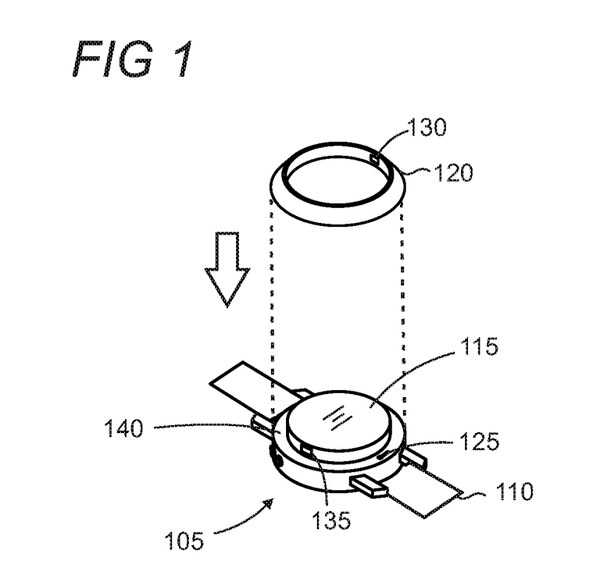
FIG. 1 shows an illustrative environment in which an external battery device in the shape of a bezel is aligned with a face of a smartwatch.

FIG. 1 shows an illustrative environment in which a smartwatch 105 has a cut-out portion 140 around the display 115 to receive an external battery device 120, which is in the shape of an aesthetically pleasing watch bezel. The smartwatch includes a wristband 110 (partially shown) which wraps and secures the smartwatch on a user's wrist. The external housing of the smartwatch and the bezel may be comprised of some form of metal, such as titanium, silver, gold, etc. The cut-out portion 140 of the smartwatch includes a connection mechanism 125 to which a corresponding mechanism (not shown) on the external battery device engages, as discussed in greater detail below. While discussion herein reference the use of an external battery device in the form of a watch bezel operating with a smartwatch, other forms of external battery devices that dually function as an aesthetic object and power source for other computing devices are also possible, such as smartphones, laptop computers, personal computers (PCs), tablet computers, head mounted display devices, etc.

The smartwatch includes electrical contact points 135 (only one shown) which engages with corresponding contact surfaces 130 exposed on an inside rim of the external battery device 120. The electrical contact points and surfaces, when engaged, enable the external battery device to transmit an electrical current (i.e., power) to the smartwatch 105. Discussion of electrical contacts, contact surfaces, contact points, and the like herein reference a form of conductive material, such as metal (e.g., copper, silver alloy, gold, etc.) that can transmit at least an electric current from one electrical contact to another.

Figure 2:
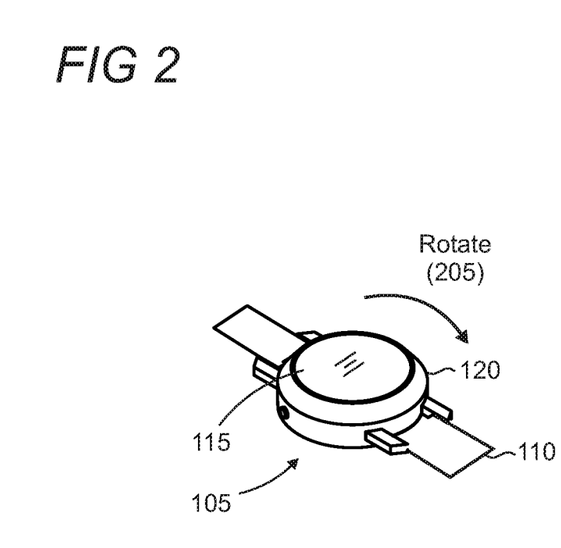
FIG. 2 shows an illustrative environment in which the external battery device is secured to the smartwatch.

FIG. 2 shows an illustrative environment in which the external battery device 120 is engaged with and secured to the smartwatch 105. As discussed in greater detail below, in this exemplary embodiment, the external battery device rotates 205 clockwise to secure to the smartwatch's connection mechanism 125. The user can remove the external battery device by a counterclockwise rotation relative to the smartwatch. The use of the external battery device with the smartwatch enables a user to easily replenish the smartwatch's internal battery or, in some implementations, can function as the sole power source itself. A user can carry around several external battery devices to replace and replenish the smartwatch's battery throughout the day. The bezels of the external battery devices can come in various colors (e.g., white, brown, black, pink, etc.) to enable a user to customize their look for a given day or event (e.g., informal and formal events). Thus, the external battery device not only functions as a portable battery that easily attaches to the user's smartwatch, but simultaneously functions as an aesthetic piece of apparel by which a user can adjust their look.

The smartwatch may have an internal battery (not shown) which provides some power to the smartwatch while the external battery devices are being replenished. The internal battery may provide a short term life in some scenarios or may be as powerful as the external battery devices, depending on the specific implementation. For example, implementing a larger internal battery can limit the internal real estate for other hardware components such as GPS (global positioning system), sensors (e.g., temperature, gyroscope, and barometer), etc. Whereas a smaller internal battery can increase the number of hardware components that can be used within the smartwatch 105. The external battery devices can supplement either type of internal battery so that the user can use resource-intensive applications and programs throughout the day.

Figure 3:
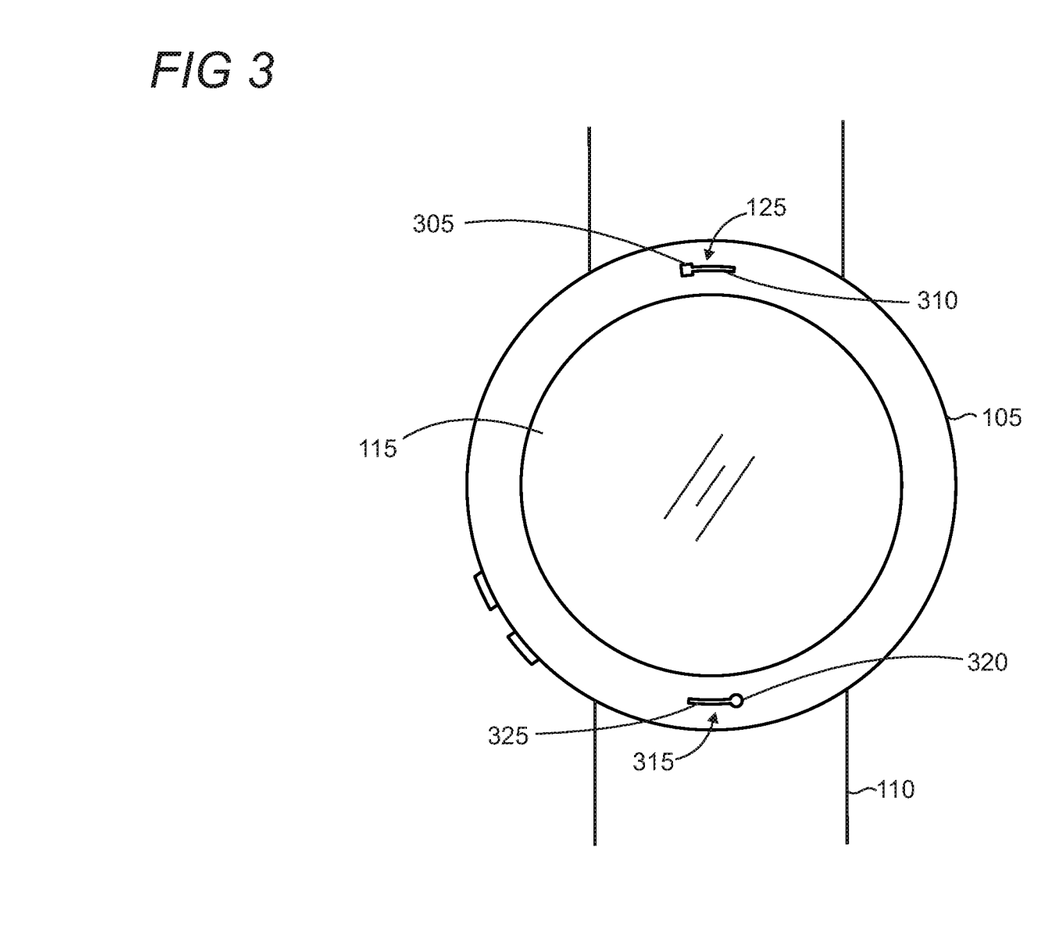
FIG. 3 shows an illustrative environment in which the smartwatch includes two female receptacles to engage with the external battery device's male connectors.

FIG. 3 shows an illustrative environment in which the smartwatch 105 includes two connection mechanisms 125 and 315. In this example, the connection mechanisms include female receptacles 305, 320 which receive a corresponding male connector from the external battery device (not shown in FIG. 3). The receptacle 305 takes the form of a square and the receptacle 320 takes the form of a circle. The use of differently shaped receptacles facilitates a single manner in which the external battery device 120 can be connected to the smartwatch. The connection mechanisms further include openings 310, 325 through which the connectors slide clockwise to secure the external battery device in place. The openings may gradually narrow or otherwise provide a press-fit mechanism upon the user exerting sufficient pressure during rotation to prevent the external battery device from loosening. Sufficient counterclockwise pressure from the user may cause the external battery device to release from the opening and be removed when the connectors are aligned with the receptacles.

Figure 4:
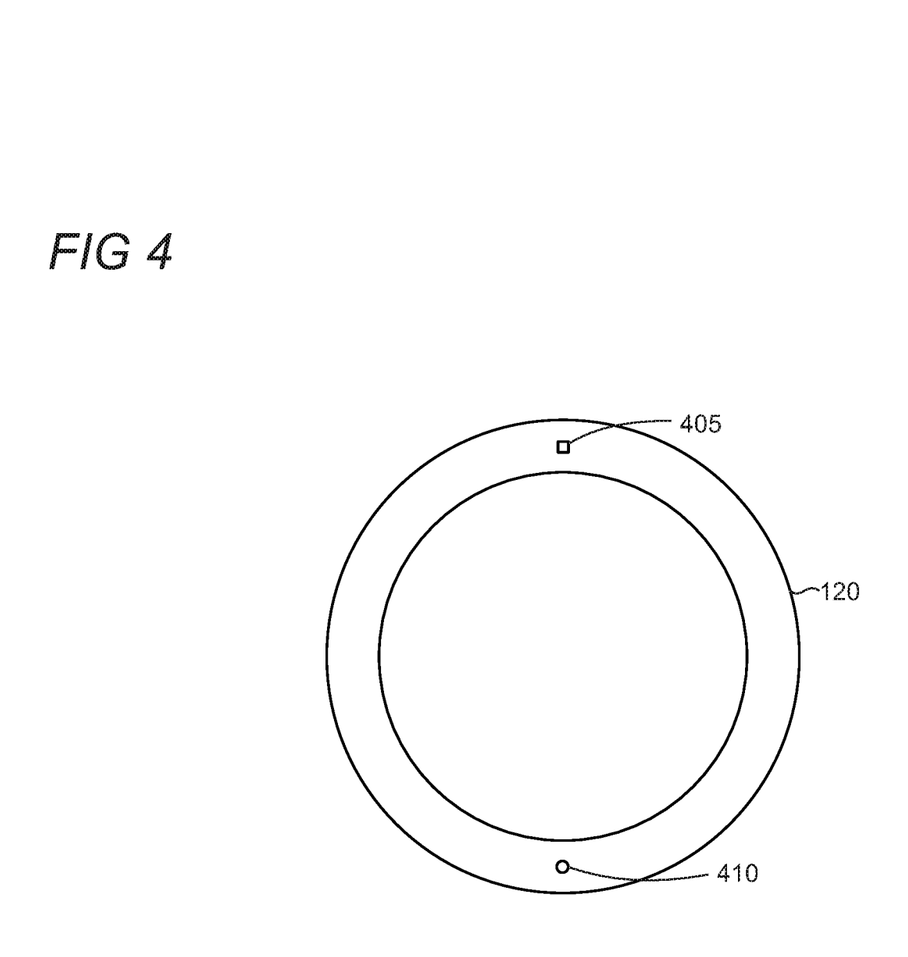
FIG. 4 shows an illustrative environment in which the external battery device has two male connectors which engage with the female receptacle on the smartwatch.
Figure 5:
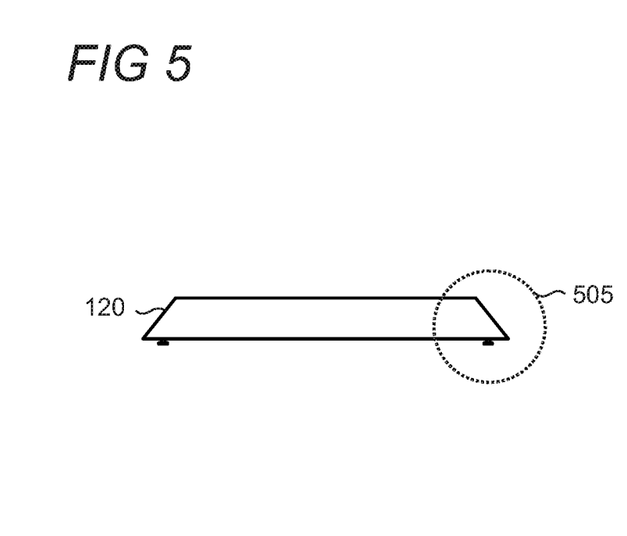
FIGS. 5 and 6 show illustrative environments of the male connectors on the external battery device.
Figure 6:
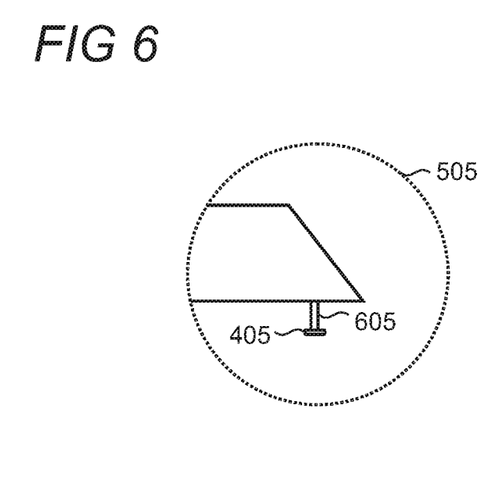

FIG. 4 shows an illustrative environment in which the external battery device 120 includes a square connector 405 and a circular connector 410 to mate with the corresponding receptacles 305 and 320, respectively (FIG. 3). FIGS. 5 and 6 show illustrative environments of the external battery device 120 from a side angle. As shown in the exploded view 505, the square connector 405 includes a shaft 605 (likewise positioned on the circular connector 410) which extends from the external battery device 120. Specifically, the external battery device is comprised of a casing and internal battery positioned inside a channel of the casing. The casing may be comprised of some form of metal such as titanium, silver, or gold, or may be formed of a rubber material to provide external protection to the smartwatch. The casing includes a hole through which the shaft 605 from the battery extends. Thus, a portion of the battery inside the casing provides the male connector for the external battery device.

Figure 7:
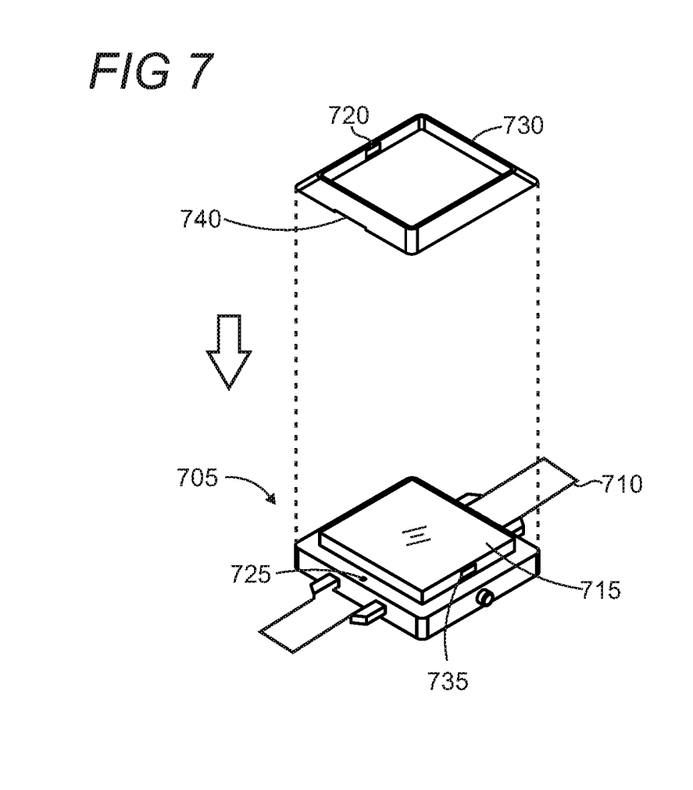
FIG. 7 shows an illustrative environment in which an external battery device in the shape of a square bezel is aligned with a face of a smartwatch.
Figure 8:
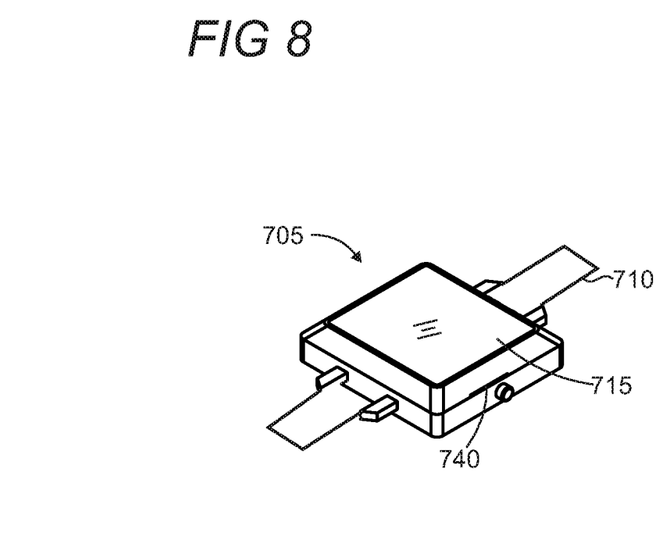
FIG. 8 shows an illustrative environment in which the external battery device is secured to the smartwatch using a press-fit mechanism.

FIGS. 7 and 8 show illustrative environments of alternative configurations of the smartwatch 705 and external battery device 720. In this implementation, the smartwatch and external battery device are shaped as a square to provide a greater variety of smartwatch designs for users. Other polygonal shapes for the bezel and smartwatch are also possible. The components in FIGS. 7 and 8 function similarly as described above for the circular smartwatch 105, including the contact surface 730, contact point 735, display 715, and wristband 710. The square smartwatch includes a press-fit mechanism such that a female receptacle 725 engages with a male connector (not shown) on the external battery device to secure the two components together. In this example, the square bezel (i.e., the external battery device) includes a cut-out 740 to enable a user to pull and detach the external battery device from the smartwatch.

Figure 9:
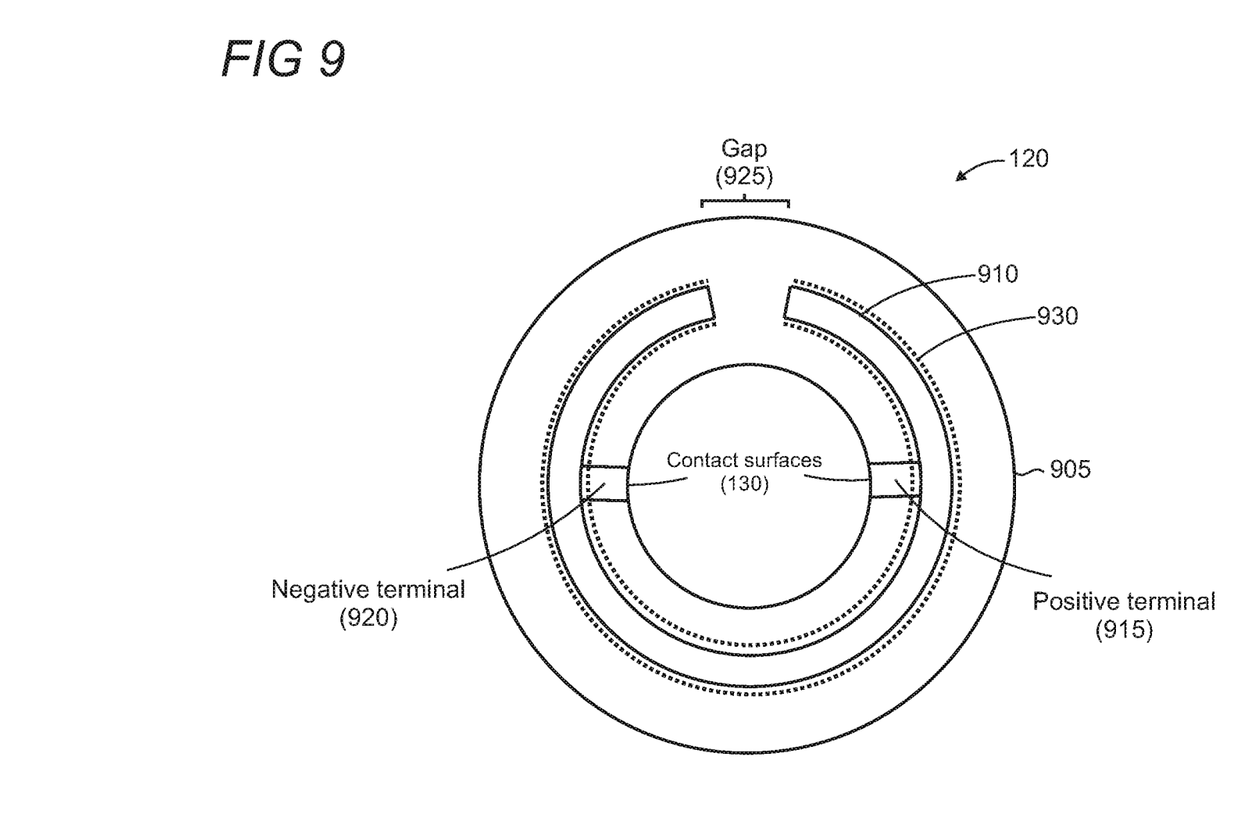
FIG. 9 shows an illustrative environment of the components and structure of the external battery device.

FIG. 9 shows an illustrative diagram in which the external battery device 120 has a casing 905 and a battery 910. The casing 905 is the outside portion observable by a user, and inside which is the battery 910. The casing includes a channel 930 inside of which the battery is positioned. In typical implementations, the shape of the battery corresponds to the shape of the channel to provide a press- or form-fit configuration. A gap 925 is formed between the two ends of the battery 910. The casing may be a single piece or may be comprised of two pieces, a top portion and a bottom portion, that are put together. For example, the bottom piece may have the channel that initially fits the battery, and then top portion compresses against the casing and battery to create a single unit. The top and bottom portions may each have a channel that the battery presses and fits into with sufficient compression.

In typical implementations, the battery 910 may be a flat surfaced lithium-ion rechargeable battery that is shaped to fit inside the watch bezel. The battery 910 includes positive and negative power connectors, or terminals, 915, 920 as with a typical battery. The power connectors 915, 920 may extend laterally from the battery through respective holes in the casing 905 to enable contact surfaces 130 to be exposed on an inside perimeter of the casing's wall. The positive and negative terminals may extend from the battery or, on other embodiments, may be flat against the battery in which case electrical connectors extend from the terminals and are exposed for use. The contact surfaces 130 enable the external battery device 120 to function and provide an electrical current to the smartwatch 105. When the external battery device is secured to the smartwatch, the connection mechanisms are configured such that the contact surfaces on the external battery device align with the contact points 135 on the smartwatch to provide the power connection.

While FIG. 9 shows an example of the circular bezel's configuration, other shaped bezels may be configured similarly, such as the square bezel shown in FIGS. 7 and 8. In implementations in which a polygonal shape are utilized for the bezel, the battery and channel may form right, acute, or obtuse angles to accommodate and correspond to the specific angle of the bezel's design. Alternatively, one or more portions of or the entire shape and angles of the channel and battery may be different than the shape of the bezel itself. The battery may still form a gap between the opposing ends of the battery as in FIG. 9.

Figure 10:
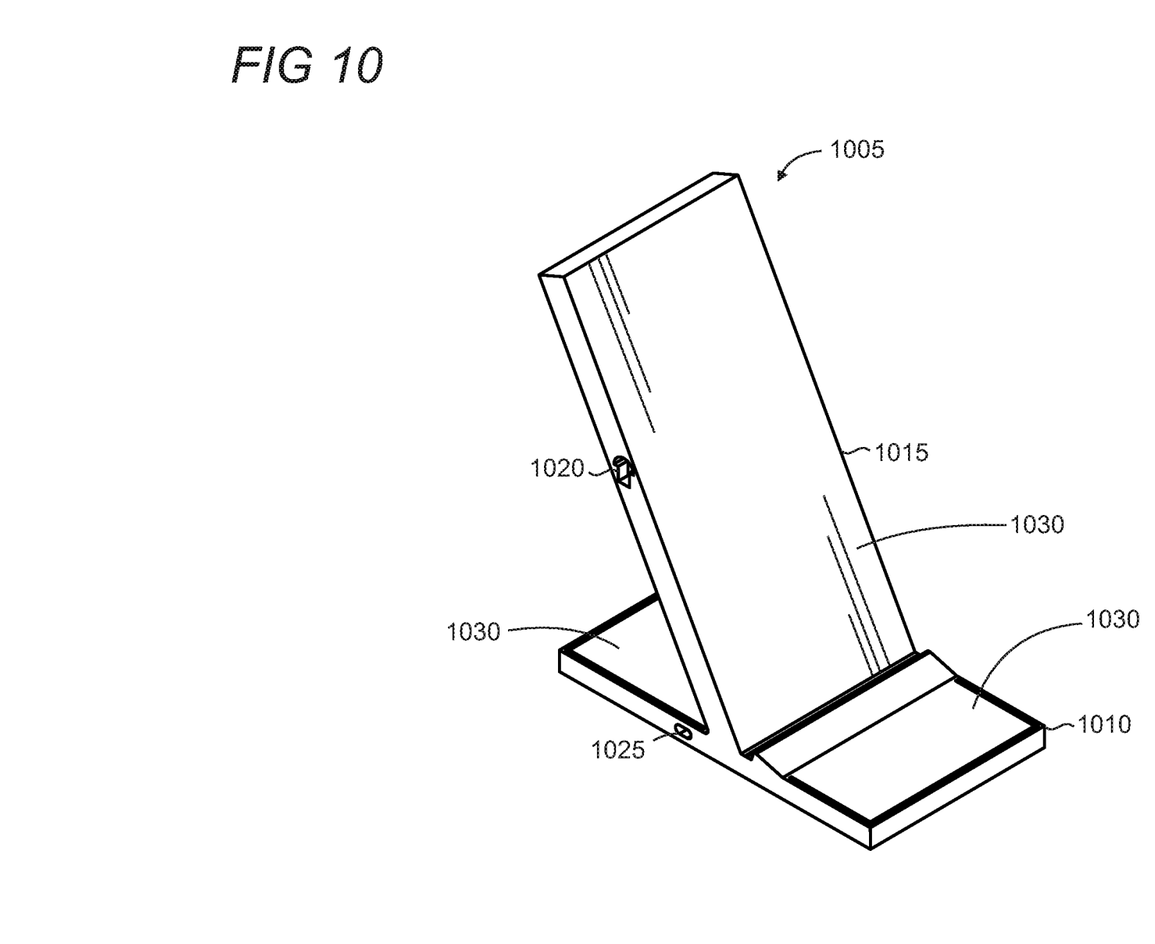
FIGS. 10 and 11 show illustrative environments of a charging device for the external battery device and other electronic devices.
Figure 11:
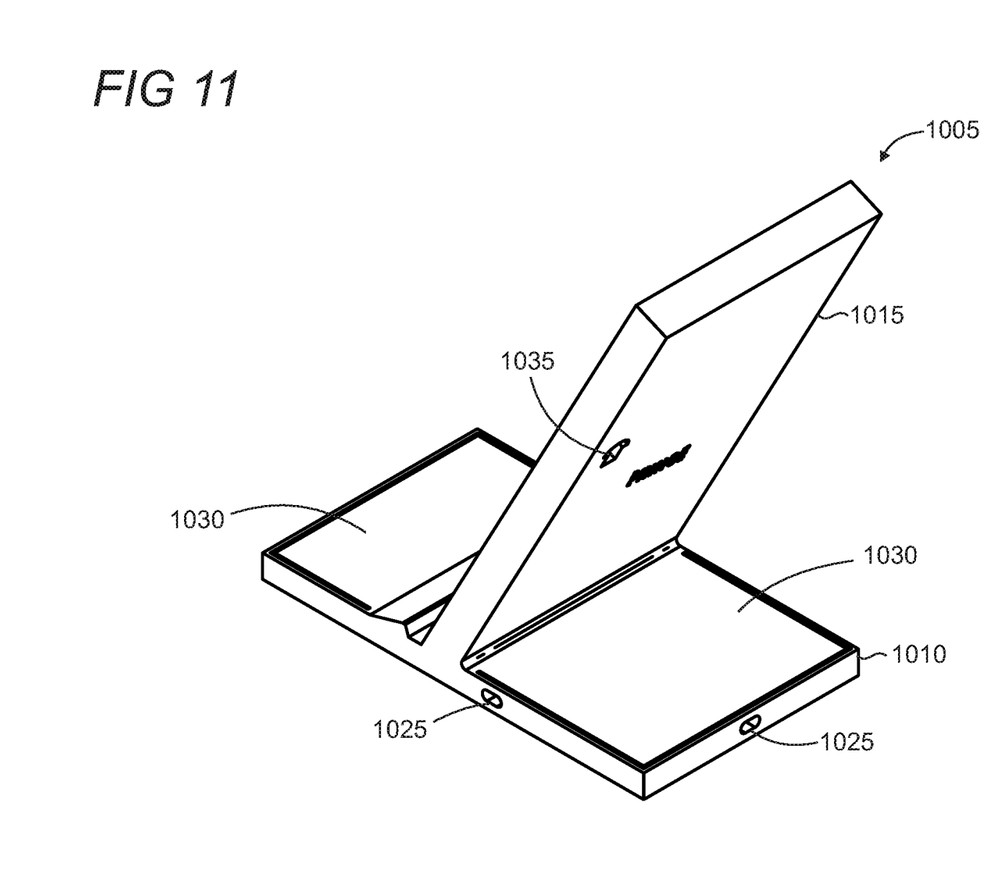

FIGS. 10 and 11 show illustrative environments in which a charging device 1005 is implemented to charge various user electronic devices, including the smartwatch 105, smartphones, and other devices having a form factor that can operate with the charging device. The internal components of the charging device can include various electrical wires and/or circuit boards that provide operative connections from the power source (e.g., AC adapter) to the various charging surfaces and electrical charging contacts associated with the charging device. The charging device 1005 may be configured with its own internal rechargeable lithium-ion battery that can provide a portable option for users. The charging device may also have a wireless charging receiving interface on a bottom surface thereof to enable wireless charging of the charging device from another wireless charger that can output an electrical current. Thus, in some implementations, the charging device may be completely leverage wireless charging to receive and output power.

The charging device includes a base 1010 and a platform 1015 that extends upward from the base. The base and platform are each configured with wireless charging technology to enable a user to place a computing device at various locations thereon. For example, the upper surfaces 1030 of the base and platform provide charging if a user decides to place, on any of the upper surfaces, an electronic device configured with wireless charging technology. In typical implementations, the charging device may transfer energy to a receiver on a smartwatch or other computing device via electromagnetic induction, in which the charger generates an alternating electromagnetic field which the receiver on the receiving device converts back into electricity form for charging its battery.

The charging device also includes one or more ports 1025, such as USB (universal serial bus) ports to which the user can connect and charge other devices from. Although not shown, the charging device includes a power port that can receive, for example, an AC (alternating current) or DC (direct current) from a plug that is connected to a power outlet. The charging device includes adapter receptacles 1020, 1035 to expand the charging device's system and provide additional adapter charging accessories. While receptacles are depicted in FIGS. 12 and 13, other forms of connection elements are also possible, including press-fit mechanisms, a release mechanism that releases a connector upon a button being pressed, etc.

Figure 12:
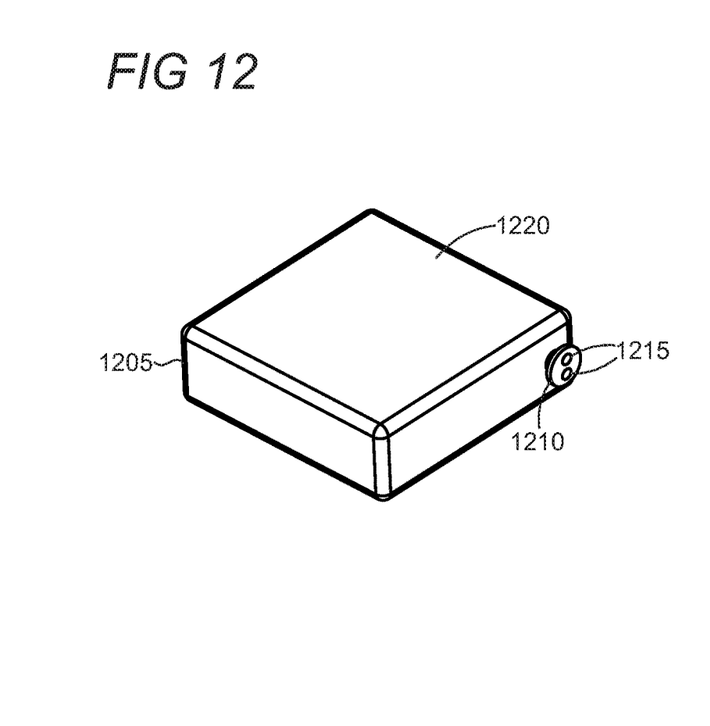
FIG. 12 shows an illustrative environment of a wireless charging pad for a smartwatch that may be used with the charging device.

FIG. 12 shows an illustrative diagram of a wireless charger 1205 which can be used, for example, for smartwatches. The top surface 1220 may be configured with wireless charging to charge the smartwatch having a wireless charging interface. The wireless charger includes an adapter connector 1210 which inserts into the adapter receptacle 1020, 1035 on the charging device 1005. The receptacles and connectors are universal such that the user can plug any device's connector into any of the receptacles on the charging device.

The electrical contacts 1215 receive an electric current to charge electronic devices via corresponding contacts that are positioned inside the receptacles 1020, 1035. Inside the receptacles of the charging device 1005 is a wall or other structure on which electrical contacts are positioned in order to transmit electricity to adapters, such as the wireless charger 1205. The electrical contacts inside the receptacles are positioned such that they engage with the electrical contacts 1215 when the wireless charger is securely engaged with the respective receptacle. In this implementation, the wireless charger descends until a neck of the connector 1210 is secured at the bottom of the receptacle 1020. The head of the connector prevents the connector from being removed without user adjustment.

Figure 13:
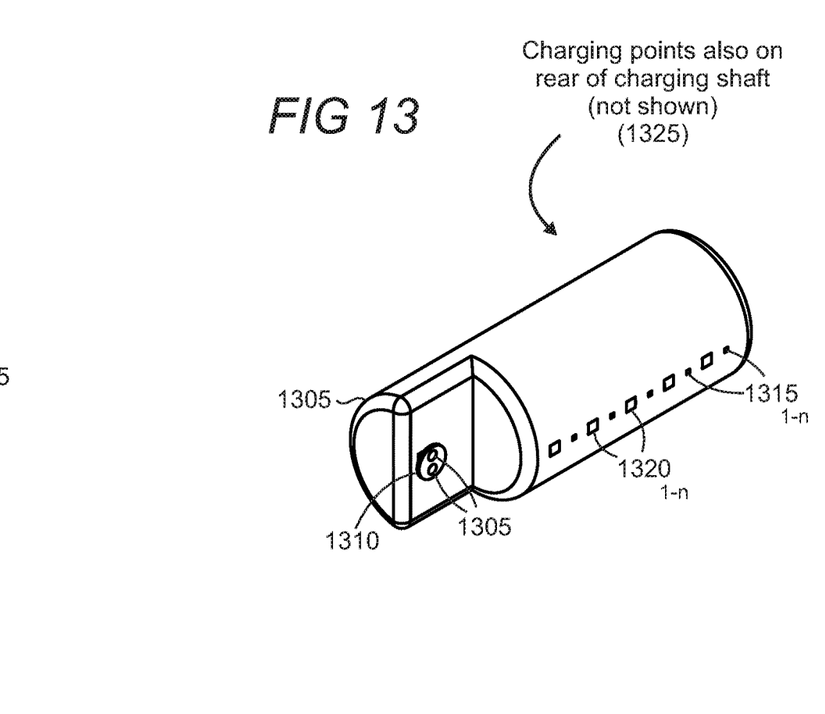
FIG. 13 shows an illustrative environment of a charging shaft for the external battery devices that may be used with the charging device.

FIG. 13 shows an illustrative diagram of a charging shaft 1305 which is configured to simultaneously charge multiple external battery devices 105. Similar to the wireless charger 1205, the charging shaft includes an adapter connector 1310 that has electrical contacts 1305 that engage with corresponding contact points within the adapter receptacles 1020, 1035 on the charging device 1005 when attached.

The charging shaft includes charging points 1320 and indicator lights 1315 which are evenly dispersed longitudinally across the charging shaft. The charging points provide conductive surfaces (e.g., metal) that can transfer electricity from the charging shaft to a connected battery, such as the external battery devices 105 and 705 (a square shaped charging shaft would be used to charge square bezels). In other implementations, the charging points may be unevenly dispersed to accommodate varying sized batteries to charge. Although not shown, the charging points 1320 may also be dispersed on an opposite side of the charging shaft to align with, for example, the contact surfaces of the external battery device 120 (FIG. 9), as representatively shown by numeral 1325.

The external battery devices are pushed over the charging shaft and then are placed at any of the charging points 1320. Each set of charging points 1320 are connected to an adjacently positioned indicator light 1315. A set of charging points may be, for example, two charging points that are axially aligned at different locations on the charging shaft (e.g., front and back in this example).

The indicator lights change color based on a detected status of the connected battery. For example, a sensor which can detect or retrieve the current battery level of the connected battery can cause an internal controller to adjust the color of the indicator light. In typical implementations, the indicator lights are red when the battery is depleted or below a set threshold, yellow when the battery is charging but not fully charged, and green when the battery is fully charged or charged beyond some set threshold. When the user has five different external battery devices connected to the five different sets of charging points on the charging shaft, each indicator light may shine red, green, or yellow depending on the specific battery's charging status. Typically, certain indicator lights may shine when an external battery device is connected to its associated contacts and may be switched off when its charging points are unused.

Figure 14:
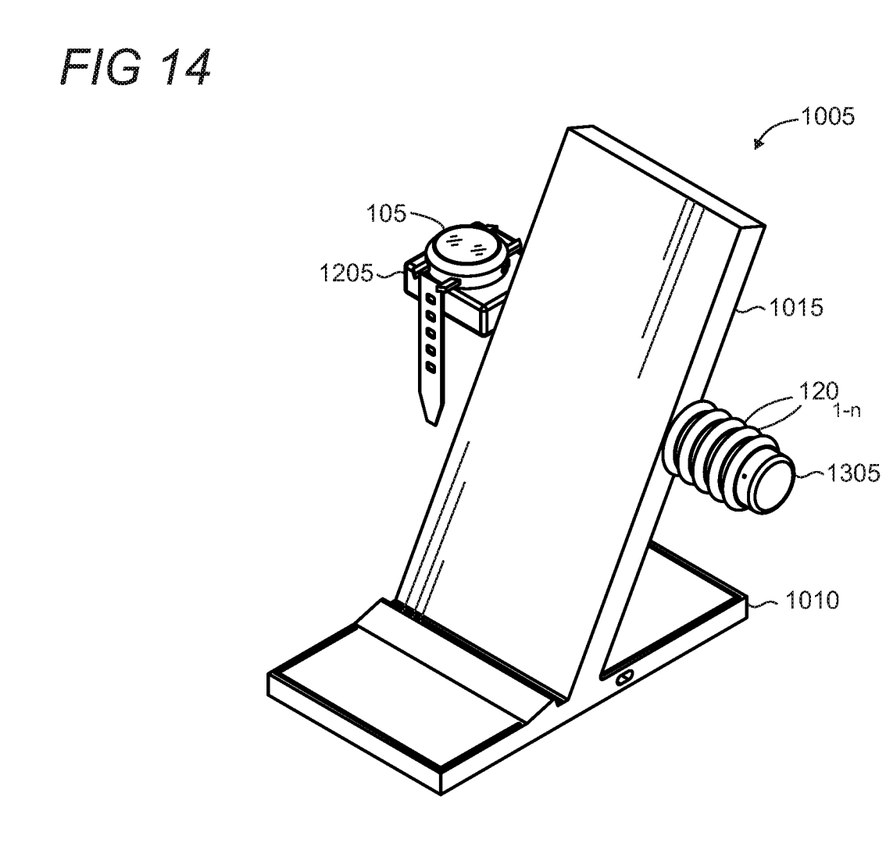
FIG. 14 shows an illustrative environment in which the wireless charging pad and charging shaft are attached to the charging device.

FIG. 14 shows an illustrative environment in which the wireless charger 1205 and charging shaft 1305 are attached to the respective adapter receptacles on the charging device 1005. The charging device transfers its power from an electrical outlet and powers the wireless charger and the charging shaft so that a user can charge multiple devices and accessory devices using this single docking station as a charging hub. As illustratively shown, the smartwatch 105 is positioned on the wireless charger and the external battery devices 120 are connected to the charging shaft to receive power.

Although a circular charging shaft and external battery devices are depicted in FIG. 14, a square battery shaft configured similarly as the circular battery shaft may also be utilized to charge square bezels (FIGS. 7 and 8). Other polygonal shapes and sizes of the battery shaft can also be implemented to accommodate other shaped and sized bezels (e.g., triangular, pentagonal, octagonal, etc.)

Figure 15:
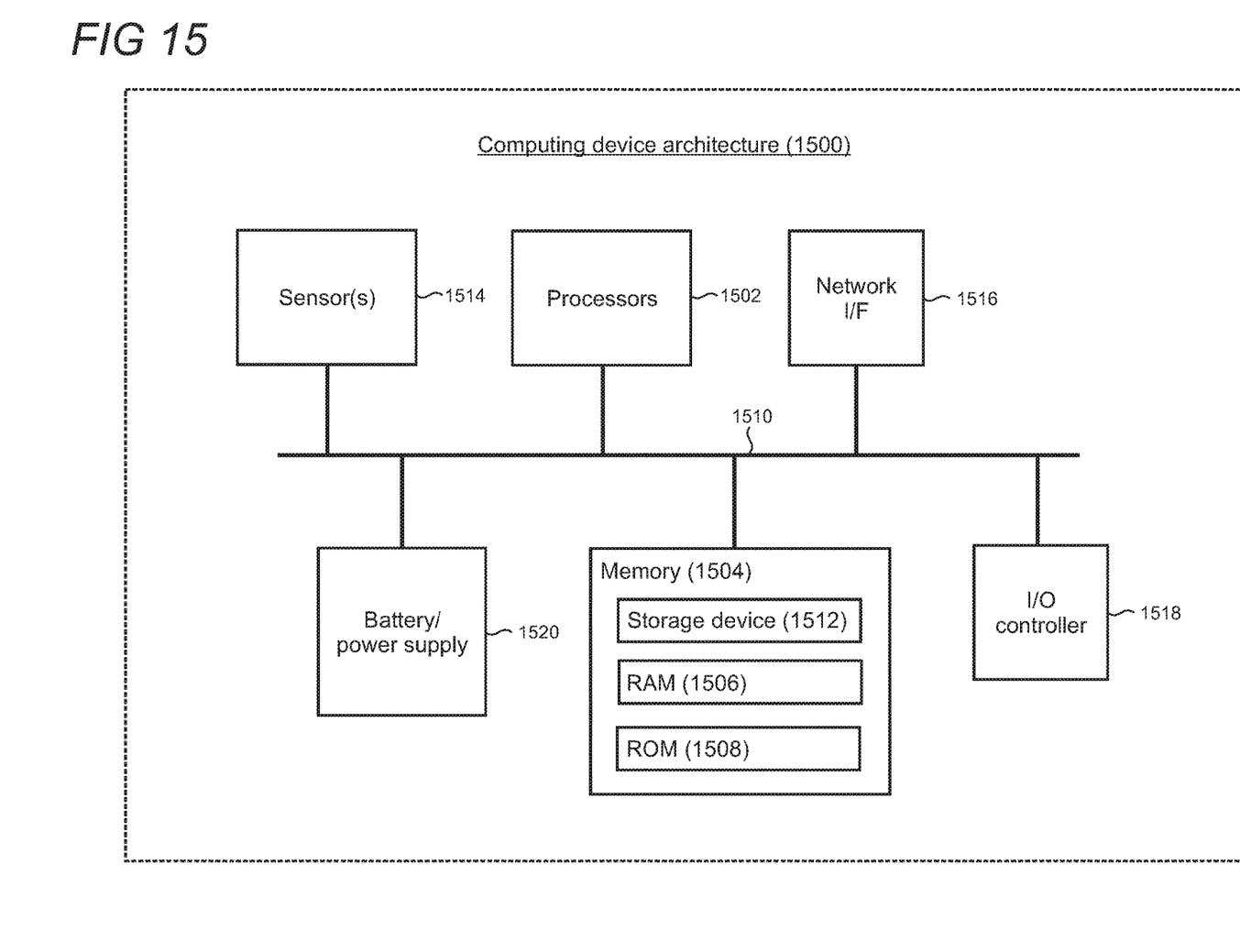
FIG. 15 is a simplified block diagram of an illustrative computing system, such as a smartwatch, that may be used in part to implement the present external watch battery and charging device.

FIG. 15 shows an illustrative architecture 1500 for a device, such as a smartphone or tablet, capable of executing the various components described herein for external battery device and charging device. The architecture 1500 illustrated in FIG. 15 includes one or more processors 1502 (e.g., central processing unit, dedicated AI chip, graphics processing unit, etc.), a system memory 1504, including RAM (random access memory) 1506, ROM (read only memory) 1508, and long-term storage devices 1512. The system bus 1510 operatively and functionally couples the components in the architecture 1500. A basic input/output system containing the basic routines that help to transfer information between elements within the architecture 1500, such as during startup, is typically stored in the ROM 1508. The architecture 1500 further includes a long-term storage device 1512 for storing software code or other computer-executed code that is utilized to implement applications, the file system, and the operating system. The storage device 1512 is connected to the processor 1502 through a storage controller (not shown) connected to the bus 1510. The storage device 1512 and its associated computer-readable storage media provide non-volatile storage for the architecture 1500. Although the description of computer-readable storage media contained herein refers to a long-term storage device, such as a hard disk or CD-ROM drive, it may be appreciated by those skilled in the art that computer-readable storage media can be any available storage media that can be accessed by the architecture 1500, including solid stage drives and flash memory.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1500.

According to various embodiments, the architecture 1500 may operate in a networked environment using logical connections to remote computers through a network. The architecture 1500 may connect to the network through a network interface unit 1516 connected to the bus 1510. It may be appreciated that the network interface unit 1516 also may be utilized to connect to other types of networks and remote computer systems. The architecture 1500 also may include an input/output controller 1518 for receiving and processing input from a number of other devices, including a keyboard, mouse, touchpad, touchscreen, control devices such as buttons and switches or electronic stylus (not shown in FIG. 15). Similarly, the input/output controller 1518 may provide output to a display screen, user interface, a printer, or other type of output device (also not shown in FIG. 15).

It may be appreciated that any software components described herein may, when loaded into the processor 1502 and executed, transform the processor 1502 and the overall architecture 1500 from a general-purpose computing system into a special-purpose computing system customized to facilitate the functionality presented herein. The processor 1502 may be constructed from any number of transistors or other discrete circuit elements, which may individually or collectively assume any number of states. More specifically, the processor 1502 may operate as a finite-state machine, in response to executable instructions contained within the software modules disclosed herein. These computer-executable instructions may transform the processor 1502 by specifying how the processor 1502 transitions between states, thereby transforming the transistors or other discrete hardware elements constituting the processor 1502.

Encoding the software modules presented herein also may transform the physical structure of the computer-readable storage media presented herein. The specific transformation of physical structure may depend on various factors in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

Exemplary systems include an external battery device that detachably engages with a computing device, comprising: a casing; a battery positioned inside the casing, wherein one or more connectors extend from the battery respectively through one or more holes in the casing, in which the one or more connectors are configured to detachably mate with corresponding connecting mechanisms on the computing device; and one or more power connectors operatively connected to the battery and which are exposed on an external surface of the casing to enable a connection with corresponding contact points on the computing device.

In another example, a shape of the battery corresponds, at least in part, to a shape of the casing. As another example, the casing and battery form an arcuate shape. In another example, the casing and battery form a polygonal shape. In another example, the casing includes a channel inside which the battery is positioned. As another example, the battery has a first end and a second end that are positioned adjacent to each other and separated by a gap. In another example, the battery is flat. As another example, the one or more power connectors include a positive terminal and a negative terminal. As another example, the computing device is a watch and the external battery device is a watch bezel that detachably engages with the watch. In another example, the casing is divided into a bottom half and a top half, each half having a channel that corresponds to a shape of the battery, and wherein the battery press fits into the respective halves when the casing and battery are assembled. As another example, a first connector of the one or more connectors is of a different shape than a second connector of the one or more connectors to provide a consistent manner in which the external battery device connects to the computing device.

Another exemplary embodiments includes a charging device, comprising: a base having a top surface configured to wirelessly charge when a computing device is placed in contact therewith; a platform that extends upward from the base and which is configured for wireless charging when a computing device is in contact therewith; and one or more connection elements on the platform to enable charging adapters to connect to the charging device.

In another example, the charging device further comprises a recess positioned on the base in front of the platform, in which the recess captures a computing device when positioned on the platform. In another example, the charging device further comprises a raised surface leading up to the recess to provide support for holding the computing device when positioned on the platform. As another example, the charging device further comprises electrical contacts that overlap with the one or more connection elements to enable operation of the charging adapters when connected. In another example, the one or more connection elements include a female receptacle, and the electrical contacts are positioned on an inside surface of the platform and adjacent to the female receptacle. In another example, the charging adapter is a wireless charging pad that extends laterally from the platform. As another example, the charging adapter is a charging shaft that includes a series of electrical contacts to simultaneously charge multiple different devices. As another example, each set of electrical contacts of the series is connected to a respective charging light that changes color based on a detected charging status of a given device. As another example, a series of electrical contacts are positioned on an opposite side of the charging shaft.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. An external battery device that detachably engages with a computing device, comprising:
    a casing;
    a battery positioned inside the casing, wherein one or more connectors extend from the battery respectively through one or more holes in the casing, in which the one or more connectors are configured to detachably mate with corresponding connecting mechanisms on the computing device; and
    one or more power connectors operatively connected to the battery and which are exposed on an external surface of the casing to enable a connection with corresponding contact points on the computing device.

2. The external battery device of claim 1, wherein a shape of the battery corresponds, at least in part, to a shape of the casing.

3. The external battery device of claim 2, wherein the casing and battery form an arcuate shape.

4. The external battery device of claim 2, wherein the casing and battery form a polygonal shape.

5. The external battery device of claim 1, wherein the casing includes a channel inside which the battery is positioned.

6. The external battery device of claim 1, wherein the battery has a first end and a second end that are positioned adjacent to each other and separated by a gap.

7. The external battery device of claim 1, wherein the battery is flat.

8. The external battery device of claim 1, wherein the one or more power connectors include a positive terminal and a negative terminal.

9. The external battery device of claim 8, wherein the computing device is a watch and the external battery device is a watch bezel that detachably engages with the watch.

10. The external battery device of claim 1, wherein the casing is divided into a bottom half and a top half, each half having a channel that corresponds to a shape of the battery, and wherein the battery press fits into the respective halves when the casing and battery are assembled.

11. The external battery device of claim 1, wherein a first connector of the one or more connectors is of a different shape than a second connector of the one or more connectors to provide a consistent manner in which the external battery device connects to the computing device.

* * * * *